(No Model.)

G. A. STUCK.
FIRE HOSE.

No. 298,321. Patented May 6, 1884.

WITNESSES
Phil C. Dietrich
A. E. Dowell

INVENTOR
Geo. A. Stuck
by:
J. K. Alexander
Attorney

UNITED STATES PATENT OFFICE.

GEORGE A. STUCK, OF SELMA, ALABAMA.

FIRE-HOSE.

SPECIFICATION forming part of Letters Patent No. 298,321, dated May 6, 1884.

Application filed February 4, 1884. (No model.)

*To all whom it may concern:*

Be it known that I, GEO. A. STUCK, of Selma, in the State of Alabama, have invented certain new and useful Improvements in Hose; and I do hereby declare that the following is a full, clear, and exact description thereof, reference being had to the accompanying drawings, and to the letters of reference marked thereon, which form part of this specification, in which—

Figure 1:
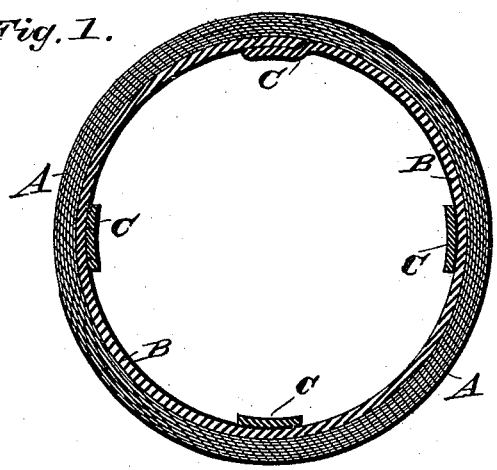
Figure 2:
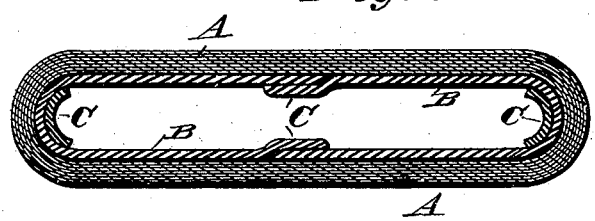
Figure 3:
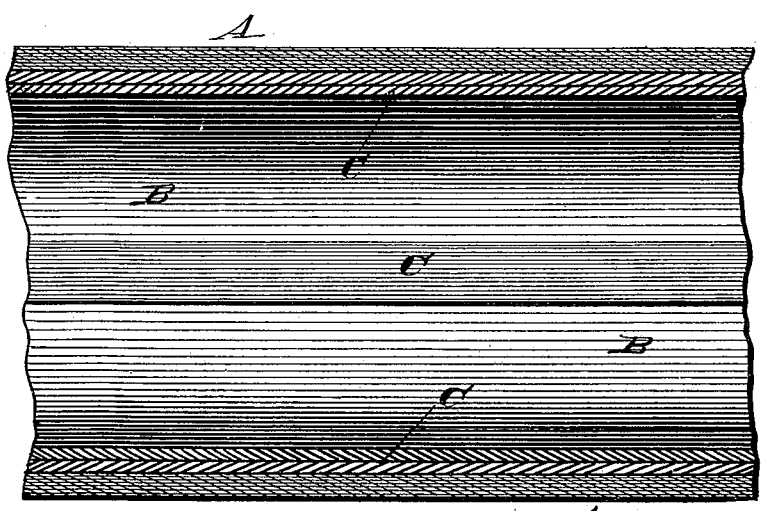

Figure 1 is a cross-section through a piece of my improved hose. Fig. 2 shows the hose as it appears when flattened by winding it on a reel. Fig. 3 is a longitudinal section of the improved hose.

This invention relates to an improvement in the manufacture of hose, especially of the kind which is composed of a woven fibrous exterior, lined with india-rubber to render it water-proof; and it consists in a novel mode of re-enforcing the india-rubber lining of the hose, whereby it is prevented from breaking or rapid destruction or deterioration in consequence of being wound flat on a reel, as will be fully understood from the following description, when taken in connection with the annexed drawings.

The hose is made of the usual well-known materials—to wit, an outer strengthening material, A, composed of weft and woof, fibrous cords woven together, and a lining, B, of sheet-rubber cemented to the woven layer A, and united by a single lapped seam. Hose thus made will in a short time, when wound on a reel, become useless, by reason of the india-rubber lining breaking and rotting along those sides which are bent and compressed when the hose is flattened and tightly reeled on a reel or other object. To remedy this objection, I may make the lining B of two or more rubber strips—preferably of four strips—of equal width, which are formed into a tube of any desired length by lapping and cementing their edges together. These lapped edges constitute the thickened portions C C, which are diametrically opposite each other in the tube, and which re-enforce the lining at those points where the hose is actually bent when it is wound flat on a reel. The thickened or re-enforcing seams C C receive all of the strain due to the compression of the hose, and these seams prevent the lining from being bent so acutely as would cause it to break at said points.

It is obvious that instead of making the rubber lining of strips having lapped joints, I can accomplish the same object by cementing narrow re-enforcing strips to the lining; or the lining may be manufactured or formed with the re-enforcing strips to the lining at the desired points, thus leaving a single lapped seam and using only one piece of rubber for the lining proper.

Having described my invention, what I claim as new, and desire to secure by Letters Patent, is—

1. A hose having two or more internal re-enforcing sectional portions arranged diametrically opposite each other, substantially as specified.

2. In a hose which is composed of a woven exterior and an india-rubber lining cemented together, two or more internal re-enforcing portions, C C, formed on or applied to said lining, substantially as and for the purposes described.

3. As a new and improved article of manufacture, a hose having an exterior layer of woven fibrous material, and a lining composed of two or more india-rubber strips, and internal re-enforced lapped seams, substantially as and for the purposes described.

In testimony that I claim the foregoing as my own I affix my signature in presence of two witnesses.

GEORGE A. STUCK.

Witnesses:
R. H. AGEE,
THOS. C. FERGUSON.